United States Patent
Priyanto et al.

(10) Patent No.: US 11,457,457 B2
(45) Date of Patent: Sep. 27, 2022

(54) METHOD AND DEVICE FOR RESOURCE ALLOCATION OF COLLIDING RADIO SYSTEMS

(71) Applicants: SONY CORPORATION, Tokyo (JP); SONY MOBILE COMMUNICATIONS INC., Tokyo (JP)

(72) Inventors: Basuki Priyanto, Lund (SE); Rickard Ljung, Helsingborg (SE); Shin Horng Wong, Weybridge (GB); Martin Beale, Weybridge (GB)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/334,191

(22) PCT Filed: Sep. 6, 2017

(86) PCT No.: PCT/EP2017/072354
§ 371 (c)(1),
(2) Date: Mar. 18, 2019

(87) PCT Pub. No.: WO2018/059895
PCT Pub. Date: Apr. 5, 2018

(65) Prior Publication Data
US 2019/0208532 A1    Jul. 4, 2019

(30) Foreign Application Priority Data
Sep. 30, 2016   (EP) ..................................... 16191920

(51) Int. Cl.
*H04J 11/00* (2006.01)
*H04W 72/12* (2009.01)
(Continued)

(52) U.S. Cl.
CPC ..... *H04W 72/1215* (2013.01); *H04J 11/0023* (2013.01); *H04L 27/2691* (2013.01);
(Continued)

(58) Field of Classification Search
CPC .................. H04W 4/005; H04W 4/70; H04W 28/0236; H04W 52/244; H04W 72/1226; H04L 27/2691; H04J 11/0023; H04B 1/1027
See application file for complete search history.

(56) References Cited

U.S. PATENT DOCUMENTS

2013/0322394 A1* 12/2013 Ishii .................. H04W 72/0453
                                                                370/329
2017/0280473 A1* 9/2017 Krishnamoorthy ........................
                                                              H04W 52/0216
(Continued)

OTHER PUBLICATIONS

R1-155748, "In-Band Design for NB-IOT", Oct. 5-9, 2015 (Year: 2015).*
(Continued)

Primary Examiner — Salvador E Rivas
(74) Attorney, Agent, or Firm — Tucker Ellis LLP

(57) ABSTRACT

Method for allocating resources (44) within a grid (40) of time and frequency for communication in a radio communications system under a first protocol, comprising determining an indication of a frequency resource range (43) to be allocated for data communication between a base station and a device within the first radio protocol; determining that a predetermined frequency resource (42) within said range is pre-allocated to communication under a second radio protocol; allocating a frequency resource (44) for the communication in the first radio protocol which overlaps and excludes said predetermined frequency resource for that data communication.

18 Claims, 2 Drawing Sheets

(51) Int. Cl.
　　　H04W 16/14　　　(2009.01)
　　　H04W 72/04　　　(2009.01)
　　　H04W 52/24　　　(2009.01)
　　　H04L 27/26　　　(2006.01)
　　　H04W 74/04　　　(2009.01)
　　　H04B 1/10　　　(2006.01)

(52) U.S. Cl.
　　　CPC ......... *H04W 16/14* (2013.01); *H04W 52/244* (2013.01); *H04W 72/0446* (2013.01); *H04W 72/0453* (2013.01); *H04W 72/0493* (2013.01); *H04W 72/1226* (2013.01); *H04W 74/04* (2013.01); *H04B 1/1027* (2013.01)

(56) References Cited

U.S. PATENT DOCUMENTS

2018/0049164 A1* 2/2018 Wu ................... H04W 72/042
2019/0320450 A1* 10/2019 Li ........................ H04W 4/70

OTHER PUBLICATIONS

International Search Report and Written Opinion from correlating International Application No. PCT/EP2017/072354, dated Nov. 9, 2017; 12 pages.

Sony: "Coexistence of eMTC and NB-IoT", [Online] Nov. 15, 2015 (Nov. 11, 2015), 3GPP Draft; RI-156693 Coexistence MTC NBIOT, 3rd Generation Partnership Project (3GPP), Mobile Competence Center'650, Route Des Lucioles ; F-06921 Sophia-Antipolis Cedex; France, XP051003078, Retrieved from the Internet: URL:http://www.3gpp.org/ftp/Meetings_3GPP_SYNC/RANI/Docs/> [retrieved on Nov. 15, 2015].

Panasonic: "Conmonality design between eMTC and NB-IOT", 3GPP Draft; RI-155776, 3rd Generation Partnership Project (3GPP), Mobile Competence Centre ; 650, Route Des Lucioles ; F-06921 Sophia-Antipolis Cedex ; France, [Online] vol. RAN WGI, No. Malmo, Sweden; Oct. 5, 2015-Oct. 9, 2015, Oct. 4, 2015 (Oct. 4, 2015), XP051039751, Retrieved from the Internet: URL:http://www.3gpp.org/ftp/Meetings_3GPP_SYNC/RANI/Docs/>—[retrieved on Oct. 4, 2015].

Panasonic: "Valid time/frequency resource indication in eMTC", [Online] Sep. 25, 2015 (Sep. 25, 2015), 3GPP Draft; RI-155758, 3rd Generation Partnership Project (3GPP), Mobile Competence Centre 550, Route Des Lucioles ; F-06921 Sophia-Antipolis Cedex, France, XP051041723, Retrieved from the Internet: URL: http://www.3gpp.org/ftp/tsg ran/WGI RL_1/TSGRI_82b/Docs/>—[retrieved on Sep. 25, 2015].

QUALCOMM Incorporated: "In-band Design for NB-IOT", [Online] Oct. 4, 2015 (Oct. 4, 2015), 3GPP Draft RI-155748 In-Band Design for NB-IOT, 3rd Generation Partnership Project (3GPP), Mobile Competence Centre ; 650, Route Des Lucioles ; F-06921 Sophia-Antipolis Cedex; France, XP051002573, Retrieved from the Internet: URL: http://www.3gpp.org/ftp/Meetings_3GPP_SYNC/RANI/Docs/>—[retrieved on Oct. 4, 2015].

Samsung, "Discussion on forward compatibility for NR", 3rd Generation Partnership Project (3GPP), Aug. 22-26, 2016, Gothenburg Sweden, R1-166743, 4 pages.

* cited by examiner

METHOD AND DEVICE FOR RESOURCE ALLOCATION OF COLLIDING RADIO SYSTEMS

TECHNICAL FIELD

This disclosure relates to methods and devices for handling resource allocation when different radio systems operate within a common grid of time and frequency. More particularly, solutions are provided for allowing communication according to a first communication protocol, such as a Machine Type Communications (MTC), while avoiding collision with communication under a second communication protocol, such as Narrow-Band Internet of Things (NB-IoT).

BACKGROUND

Machine-to-Machine (M2M) communications often refers to technologies that allow devices to communicate with each other, with little human intervention. Such M2M communication devices typically may store data, and may transmit data to other M2M devices or to a server over a network, such as a cellular network.

In the 3rd Generation Partnership Project (3GPP) Long Term Evolution (LTE) and its evolution LTE-Advanced (LTE-A), one version of M2M has been developed under the term Machine Type Communications (MTC). An MTC device may perform automatic data transmissions in a network wherein each data transmission can be initiated by a first machine, routed through a network, and delivered to one or more other machines. When operating under a 3GPP system, such as an LTE system, scheduling of resources for such communication is controlled by the network, typically within the base station, or the eNode B (eNB) as denoted in LTE. A new 3GPP LTE release 14 Work Item (WI) on further enhanced MTC (feMTC) has been introduced and one of the key features is supporting wider bandwidth up to 5 MHz for data shared channel transmission. This is significantly wider than eMTC with 1.4 MHz bandwidth.

In present and future radio communications systems, two or more different communication protocols may well be operated throughout a common resource grid. In addition to legacy LTE control and data communication and MTC, another system that can co-exist is the in-band deployment of a Narrow-Band Internet of Things (NB-IoT) system. Operating under such a protocol, an NB-IoT carrier of ~200 kHz can be located within the assigned bandwidth of LTE operation. Such a scenario results in the risk of collisions in resource allocation, unless handled by means of scheduling. In legacy LTE, there is in general larger flexibility in the allocation compared to the MTC systems. There is also a resource allocation method for legacy LTE devices which can be flexible enough to avoid an NB-IoT carrier. LTE uses resource groups and by combining different resource groups one can avoid an NB-IoT anchor carrier. However, in eMTC the network scheduler can only allocate contiguous physical resource blocks (PRB) within a narrowband, which makes it more difficult to avoid an NB-IoT carrier if it falls right in the middle of the narrowband.

SUMMARY

An object of this disclosure is to provide a solution for handling resource allocation for data communication within a resource grid in which communication may be operated under at least two different protocols, so as to avoid allocation collision.

According to one aspect, a method is provided for allocating resources within a grid of time and frequency for communication in a radio communications system under a first protocol, comprising determining an indication of a frequency resource range to be allocated for data communication between a base station and a device within the first radio protocol;

determining that a predetermined frequency resource within said range is pre-allocated to communication under a second radio protocol;

allocating a frequency resource for the communication in the first radio protocol which overlaps and excludes said predetermined frequency resource for that data communication.

In one embodiment, said allocated frequency resource comprises a discontinuous range of frequency resource units, encompassing said range.

In one embodiment, said indication of a frequency resource range comprises identification of a number of frequency resource units and an indication of a position of the range within the grid.

In one embodiment, the indication of a position of the range comprises identification of a frequency resource unit having a predetermined position in said frequency resource range.

In one embodiment, the allocated frequency includes a frequency resource corresponding to the excluded predetermined frequency resource, taken at a different frequency resource position.

In one embodiment, the allocated frequency resource is reduced so as to include fewer resource units than said range, by skipping the excluded resource.

In one embodiment, the method comprises the step of not transmitting data under the first protocol in the excluded resource, for puncturing by a receiver in the device.

In one embodiment, the method comprises the step of rate matching transmission to the reduced allocated resource.

In one embodiment, the method comprises the step of broadcasting an indication of the pre-allocated frequency resource from the base station, for reception in the device.

In one embodiment, the method comprises the step of determining if the predetermined frequency resource is used or unused under a second radio protocol for a certain time period;

including the predetermined frequency resource, for at least said time period, in the allocated frequency resource.

In one embodiment, the method comprises the step of communicating, by dedicated signaling, an indication of the frequency resource range from the base station to the device.

In one embodiment, the base station comprises a scheduler device and the device is a user device.

In one embodiment, the first radio protocol and the second radio protocol are scheduled by a common radio system using the same resource grid.

In one embodiment, the method comprises the step of sending a second indication by the base station to temporarily inactivate the indication of overlap.

According to another aspect, the invention relates to a scheduler device in a radio communications system, comprising:

a processor; and a computer readable storage medium storing programming for execution by the processor, the programming including instructions to carry out the steps of any of the preceding method steps.

According to another aspect, the invention relates to a method carried out in a device for controlling communication to a base station in a first radio protocol, using resources allocated within a grid of time and frequency, comprising receiving an indication of a frequency resource range;

receiving an indication of a predetermined frequency resource within said range, which is pre-allocated to a second radio protocol;

determining the allocated resources for data communication in the first radio protocol, which overlaps and excludes said predetermined frequency resource for that data communication, according to a predetermined rule.

In one embodiment, the allocated frequency resource comprises a discontinuous range of frequency resource units, encompassing said range.

According to another aspect, the invention relates to a user equipment comprising:

a processor; and a computer readable storage medium storing programming for execution by the processor, the programming including instructions to carry out the steps of any of the preceding method steps.

BRIEF DESCRIPTION OF THE DRAWINGS

The invention will be described in detail below with reference made to the appended drawings, in which.

DESCRIPTION OF EMBODIMENTS

In the following, the detailed description describes example embodiments of the present invention in relation to broadband wireless wide area networks, but it may be noted that the invention is not limited thereto and can be applied to other types of wireless networks where similar advantages can be obtained. Such networks specifically include wireless local area networks (WLANs), wireless personal area networks and/or wireless metropolitan area networks. Furthermore, description will be given primarily of embodiments related to MTC under LTE, but the invention is applicable also to other types of radio systems where scheduling may be required to avoid collision of co-existing radio protocols, and may also include coming systems such as discussed under the concept of NR (New Radio).

Figure 1:
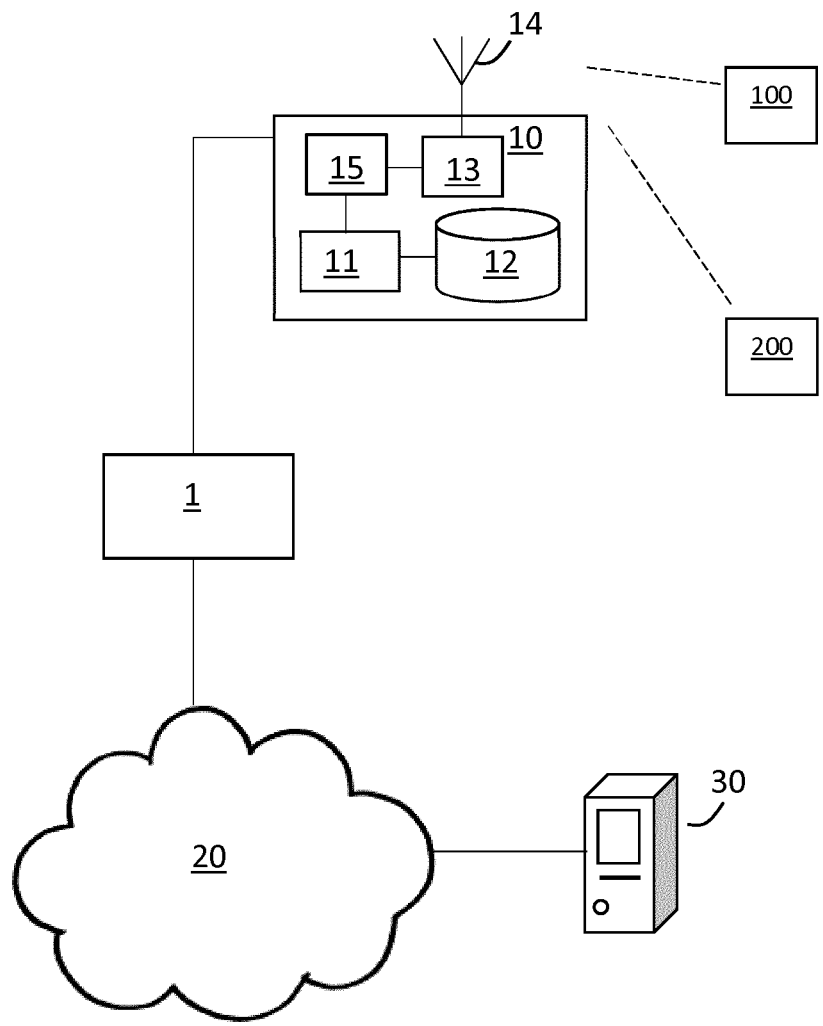
FIG. 1 schematically illustrates devices in a radio communications network.

FIG. 1 illustrates, on a schematic level, a radio communications system in which an embodiment of the invention may be realized. The radio communications system may include a core network 1, which in turn may be connected to other networks 20 including the Internet. For the purpose of providing wireless radio communication, the system may include a radio base station 10, which may be connected to the core network 1. In one embodiment, the base station 10 may provide radio access within a dedicated area, within which radio devices 100, 200 configured to operate in the radio communications system may be connected to the base station 10. The radio communications system may be cellular, and is mainly referred to herein in the example of LTE, in which the base station 10 may be an eNB. Alternative embodiments may be non-cellular, though, such as WLAN, where the radio base station 10 may rather be an access point.

A base station 10 may take several different forms and incorporate different functions. As exemplified in the drawings, though, a base station 10 may comprise a controller 11 including a processor. A data storage device 12 including a computer readable storage medium is further included, storing programming for execution by the processor of the controller 11. As is known in the art, certain program code or applications may also reside in other entities, accessible as cloud-based through the core network 1. The base station 10 further comprises or is connected to a radio transceiver member 13, which in turn is connected to an antenna 14. A connection interface (not shown) for wire-bound communication with the core network 1 may also be included. The base station 10 may also comprise a scheduler 15, which as such may be realized by execution of code and program instructions by the controller 11, although the scheduler is represented by a functional block in the drawing.

Devices 100, 200 may communicate with each other or with other devices, such as a network server 30, through or at least under the control of the radio base station 10. In a direct communication D2D, resources may be scheduled or otherwise controlled by the base station 10, whereas communication may be carried out directly between adjacent devices 100, 200 over radio. In another embodiment, communication between devices 100, 200 will, even when they are close enough to detect each other, normally be carried out through the base station 10.

Figure 2:
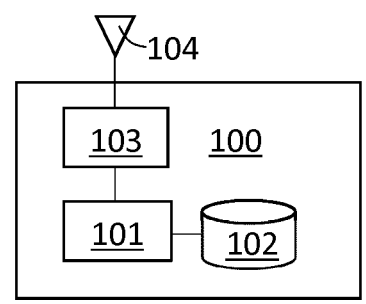
FIG. 2 schematically illustrates components of a communication device for operating in a system of FIG. 1.

FIG. 2 discloses a block diagram of certain elements forming part of a communications device 100. As for the base station 10, the communications device may take several different forms and incorporate different functions. As exemplified in FIG. 2, a communications device 100 may comprise a controller 101 including one or more processors. A data storage device 102 including a computer readable storage medium is further included, storing programming for execution by processors of the controller 101. Additional software programs or code may reside in other entities, accessible as cloud-based through the core network 1. Device 100 further comprises a radio transceiver member 103, which in turn is connected to an antenna 104. As will be readily understood by the skilled reader, the communications device may comprise a number of other features and functions, such as a user interface, a power supply etc., but such features are left out of the drawings since they do not add to the understanding of the invention and its benefits. Communication devices 100, 200 configured to communicate in the communications system may e.g. be mobile phones, tablets, computers, wearables etc., configured to relay speech communication, images, streaming data, data for download etc. In addition, devices 100 may also be configured to communicate at low data rate and/or with long cycles of inactivity between transmissions, such as utility gauges, sensors, measuring and monitoring devices and so on, targeted by systems such as MTC and NB-IoT.

Figure 3:
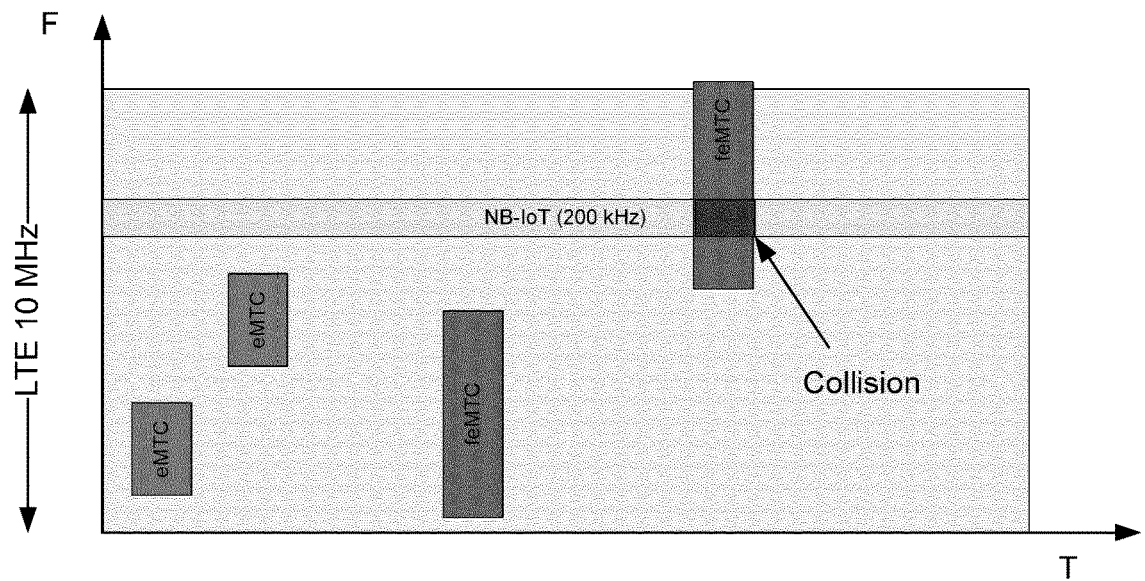
FIG. 3 illustrates an example of a resource grid for use under at least two different communication protocols handled in the same communications system.

FIG. 3 illustrates a resource grid for a radio communications system, here in the example of an LTE system, and indicates co-existence of several radio access systems. The vertical axis represents the frequency level whereas the horizontal axis relates to time. The entire grid width may in this respect represent one or more LTE sub frames or frames, for the example of an LTE systems. Within a radio communications system, communication may be carried out under two or more different protocols, while making use of resources within a common grid of time and frequency. Herein, radio communication within a radio communications system under a certain specific protocol (or set of protocols) will also be referred to as communication under a certain system, e.g. an MTC system, which may be carried out within an LTE system.

In the example of FIG. 3, co-existence of various systems is directed to the presence of one or more different MTC systems, both eMTC and feMTC being depicted, as well as an NB-IoT system. In one embodiment, allocating resources for a first communications system, i.e. communication under a first protocol, may need to consider the pre-allocation of a predetermined frequency resource for a second system. The second system may then be pre-allocated a frequency resource comprising one or more frequency resource units. This will be described in the following for the example of feMTC and NB-IoT.

When communication is to be carried out in a first radio system, e.g. feMTC, radio resources need to allocated. When a relatively large bandwidth is desired for channel transmission, such as in the depicted example of up to 5 MHz in a 10 MHz grid, there is a likelihood that the allocated resources will overlap the pre-allocated resources.

In an LTE system including in-band NB-IoT, an NB-IoT anchor carrier may be configured to occupy 1 dedicated resource block (RB) of the LTE system, as indicated in the drawing. One RB is an example of an LTE frequency resource unit. In the network, such as in the base station 10, the scheduler 15 is configured to allocate the resources in the radio communications system. In the example of an LTE system, the scheduler 15 may allocate resources to data communication with legacy LTE devices (User Equipment, UE), eMTC UEs, and also feMTC UEs. The resources should be uniquely assigned to each UE. However, as shown in FIG. 3, a dedicated NB-IoT carrier and wider feMTC allocation can increase the risk of resource collision.

Avoiding collisions places limitation on the LTE scheduler in terms of where it can allocate particular feMTC UE resources. The straightforward solution to this problem is to allocate resources to radio systems such as eMTC and feMTC only in contiguous resource units that do not overlap with the pre-allocated resources, such as in the examples to the left in the drawing. However, that would also place undesirable limitations on the scheduling function. Therefore, the present disclosure suggests a different method for resource allocation including information signaling, to avoid resource collision between two systems, e.g. NB-IoT and feMTC. This solution involves high flexibility of the base station scheduler, and minimized signaling between base station 10 and the device 100, 200.

When a scheduler 15 is to allocate resources within a grid of time and frequency for communication in a radio communications system under a first protocol, it will determine an indication of a frequency resource range to be allocated for data communication between a base station and a device within the first radio protocol, such as feMTC. In this context, the range may correspond to a number of frequency resource units, such as RBs. The indication of a frequency resource range may be a specific ID, a predetermined number of bits, a code or similar, which can be translated into a direct identification of the size and place (in frequency and/or time) of the resource, e.g. by means of consulting a look-up table in a local memory 102 in a device 100. In an alternative embodiment, the identification of the range may be more specifically given, as a measurement of place and size, e.g. expressed in number and/or ID of resource units, e.g. RBs.

As such, the indication may thus provide identification of a number of frequency resource units and an indication of a position of the range within the grid. The indication of a position of the range may e.g. comprise identification of at least one frequency resource unit having a predetermined position in said frequency resource range, such as the first, last or center frequency resource unit.

It may be determined that a predetermined frequency resource within the range intended for the first radio system, is already pre-allocated to communication under a second radio protocol, such as by the scheduler 15. This is exemplified by the scheduling shown to the right in FIG. 3, where a risk for collision exists, should there be data communication under the second protocol (NB-IoT) when data communication is carried out under the first protocol (feMTC). In this scenario, the scheduler is configured to allocate a frequency resource for the communication in the first radio protocol which overlaps and excludes said predetermined frequency resource for that communication. This may be obtained by the allocated frequency resource comprising a discontinuous range of frequency resource units, encompassing said range, such that collision is avoided in the predetermined frequency resource.

Information about the pre-allocated second system frequency resource, such as anchor carriers for NB-IoT in the shown example, shall preferably be accessible to all devices 100, 200 served by the base station 10. In one embodiment, this information is shared by the base station 10 to other devices 100, 200 in coverage, e.g. in the LTE cell served by the base station 10. In a preferred embodiment, this is obtained by means of broadcast signaling of an indication of the pre-allocated frequency resource. As already exemplified, the indication of the pre-allocated frequency resource may be indirect, requiring further decoding or table searching in a memory 102 in the receiving devices 100, 200, or the indication may e.g. contain specific information identifying the frequency resource unit(s) included in the re-allocated resource. In one embodiment, the information transfer may be based on informing devices 100, 200 about one out of several pre-determined frequency resources that may be pre-allocated, such as NB-IoT anchor carrier configurations. In such an embodiment, absolute information of the anchor location need not be shared, but rather an indicator of which one(s) of the pre-determined configurations is used. The exact location in the grid of such indicated configuration may than be determined in the device 100, e.g. by means of the controller 101 accessing a lookup table in memory 102. In a preferred embodiment in LTE, the indication of pre-allocated resources is signaled in system information (SIB). By conveying this information in SIB, device-specific signaling may be avoided for this purpose, which minimizes the total amount of signaling. Furthermore, in such an embodiment, signaling may be repeated with very long intervals in SIB, such as several seconds, and will thus be obtained with very economic broadcast signaling. In an alternative embodiment, device-specific signaling may be carried out, rather than broadcasting, e.g. by unicast RRC signaling. Also in that embodiment, the indication of the pre-allocated frequency resource may be indirect, for further processing, decoding or mapping by the device 100, 200 to establish the specific size and place of the pre-allocated predetermined resource, or it may be specific.

In one embodiment, a dual mode feMTC/Nb-IoT UE may be able to decode NB-IoT system information and signaling, and to determine directly from the NB-IoT system the location of the NB-IoT anchor carrier and secondary carriers.

Once communication devices are aware about the location of pre-allocated resources, such as NB-IoT anchor carrier allocations, a common rule known by both the base station 10 and the devices 100, 200 may be followed. More specifically, the device will then be configured to determine the allocated resources to be used for data communication in the first radio protocol, such as feMTC, which overlaps and excludes the predetermined frequency resource that were pre-allocated to the second radio protocol, such as NB-IoT, according to a predetermined rule. This may be beneficial when the allocated resources of the device collide with the pre-allocated resources, such as NB-IoT anchor or secondary carriers. In one embodiment, a "postponing" rule may be applied. In an alternative embodiment, a "skipping" rule may be applied. These embodiments are further elaborated below.

Figure 4:
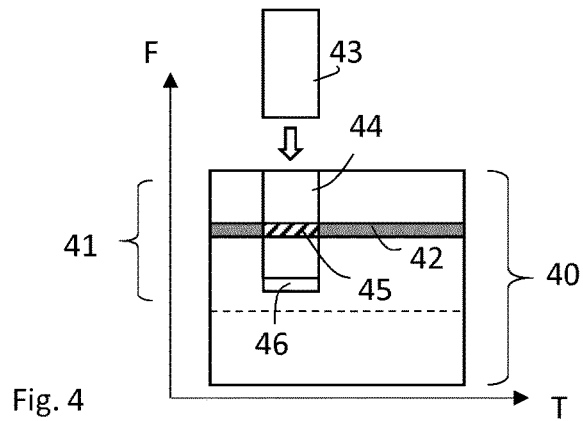
FIG. 4 illustrates an embodiment of scheduling communication for avoiding collision.

FIG. 4 illustrates, by way of example, an embodiment introducing a postpone method. This figure is similar to the situation in the right part of FIG. 3, where a risk for collision is present. In order to avoid the collision, the overlapping resource units 45 are deemed to be invalid for this communication under the first radio protocol or system, e.g. feMTC, since they are pre-allocated to the second radio protocol or system, e.g. NB-IoT. In this embodiment, a common allocation rule known be both the base station 10 and the device 100 involves that the device 100 postpones the invalid resource units, such as RB(s) 45, and this postponing operation is known by both the base station 10 and the device 100.

In FIG. 4, the system bandwidth of the resource grid is indicated by the height 40 of shown box. A portion of the system bandwidth may be a narrowband 41, or a set 41 of smaller narrowbands, which may comprise 24 RBs in an LTE embodiment. In one MTC embodiment, such a smaller narrowband may comprise 6 RBs, whereby a set 41 of 24 RBs comprises 4 narrowbands. The base station 10 sets the frequency resource range 43 for a data transmission to be setup in the first radio system, and determines information indicating which resource units are to be included in that range. This indication of the frequency resource range 43 may comprise identification of a number of frequency resource units, such as RBs, and an indication of a position of the range within the grid of the system bandwidth 40, such as an identification of the resource unit with the highest or lowest frequency, or e.g. an indication of the highest and lowest frequency resource units of the range 43. As shown in the drawing, one or more RBs are pre-allocated for use in that narrowband 41, such that one or more resource units 45 would overlap. This or these resource unit(s) are then deemed invalid, e.g. by the controller 101 in the device 100, for this communication. In this situation, a postponing mechanism would be activated, as a method for both the base station 10 and the device 100 to use to interpret allocation information. More specifically, the invalid resource units are not used to contribute to the count of the indicated range 43, but instead an equal number of resource units 46 as those deemed invalid 45 are taken out at a different frequency resource position, e.g. counted at an end of the range, so as to determine the frequency resource 44 allocated to the data transmission. For the sake of clarity, it should be noted that by postponing is not meant postponing in time here, but in frequency, such that a resource corresponding to an invalid frequency resource unit is taken out at a different frequency level or position. With respect to rate matching, a postponing principle may in one embodiment include postponing each resource unit, counted from an excluded resource unit 45, one step (or number of steps if more than one unit is excluded) until an end of count for the range 43.

As an example in LTE, where a resource is to be allocated overlapping a pre-allocated in band resource 42, a UE 100 may be provided with at least an indication of a range 43 allocated to it, which may specify or provide information for the UE to decode or retrieve, a certain number of RBs and a start RB. The allocation for the UE starts at the start RB and the eNB and UE count resources allocated to the UE; if one of the RBs 45 is invalid, e.g. due to a collision with NB-IoT, then the allocation of that RB to the UE is postponed, i.e. the invalid RB 45 does not contribute to the count of the number of RBs allocated to the UE and further valid RBs are then considered for allocation to the UE. The benefit of this approach is that the eNB does not have to inform all of the detailed resource allocation information and thus, minimizes the signaling. As mentioned above, information of the presence and location of pre-allocated resources in the grid may be informed, e.g. broadcast, as system information, or may even be inherent in the system and thus known to the UE.

In a more specific example, which may also be usable for understanding the general concept, a data communication transmission to be carried out requires 20 RBs, which is the range 43 of resources required. This range is allocated by the eNB 10. Both the eNB 10 and the device 100 is aware of the collision risk with the NB-IoT anchor carrier, i.e. an invalid RB 45 is present in the UE's 100 narrowband 41. The UE 100 and the eNB 10 would then map the RBs of the range 43 such that the invalid RB 45 is postponed and instead an additional RB 46 is included. Thus, the allocation spans 21 RBs since the invalid RB 45 is not counted as part of the 20 RBs.

Based on the postponing rule, the actual allocation 44 to the UE 100 is the 21 RB spanning allocation shown in the 24 RB wide narrowband. Without the postponing rule, which involves the UE 100 having knowledge of the presence of a pre-allocated resource, and how to handle a collision risk, the allocation spanning 21 RBs may need to be signaled using:

a start RB (e.g. 5 bits to indicate one out of 24 possible RBs in a 24 RB narrowband bandwidth)

a number of RBs (e.g. 5 bits to indicate an allocation of between 1 and 24 RBs)

a location of the invalid RB (e.g. 5 bits to indicate one RB location out of 24 for the invalid RB)

With the postponing rule, only the start RB and number of RBs needs to be signaled (i.e. the eNB signals a 20 RB allocation range 43, which maps to a physical allocation spanning 21 RBs, of which one RB is invalid), hence saving 5 bits of allocation signaling. The invalid RB 45 location may be known through the SIB, or the location of such a pre-allocated resource may be system specific, predetermined by specification and thus known to both the base stations 10 and the devices 100, 200 of the system. In an alternative embodiment, UE specific signaling may provide an indication or specific details of the location of the NB-IoT carrier.

Figure 5:
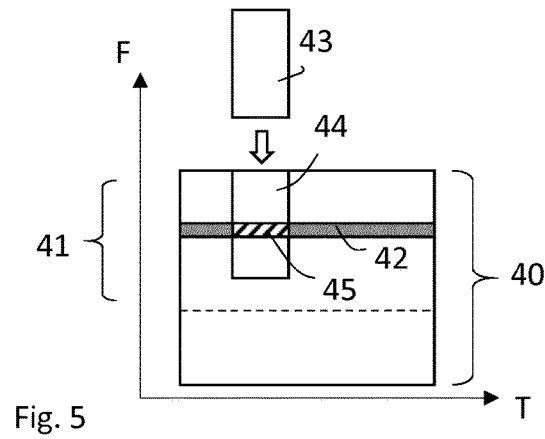
FIG. 5 illustrates another embodiment of scheduling communication for avoiding collision.

In another embodiment, the device 100 skips the invalid frequency resource units, rather than postponing it/them. This is illustrated in FIG. 5, which to a large extent is similar to FIG. 4, and the same reference numerals are thus used. Also here, reference is made to an example embodiment set out in LTE. In this type of embodiment an invalid RB reduces the number of RBs allocated. For example, in FIG. 5, the eNB allocates 20 RBs where these 20 RBs overlap an invalid RB (due to collision with anchor NB-IoT carrier). The eNB and UE would map the allocated RBs where the collided RB (NB-IoT carrier) replaces the allocated RB, meaning that the invalid RB 45 will be skipped and not used for the transmission in the first radio system, e.g. feMTC, resulting in an effective total of 19 RBs being allocated while the RB mapping 44 spans 20 RBs as the indicated range 43.

In this case, there are different possibilities for transport and physical channel processing. In one embodiment, the transmission to be carried out in the first radio system, such as feMTC, is rate matched to the full range 43, e.g. 20 RBs. The (feMTC) resources that collide with the pre-allocated resource (NB-IoT carrier) may then not be transmitted by the base station 10 (eNodeB) in the downlink, and be punctured by the device 100 (UE) in the receiver. In another embodiment, the transmission to be carried out in the first radio system (e.g. feMTC) is rate matched to the allocated resource 44, which equals the indicated range 43 minus the invalid resources 45, such as 19 RBs in the illustrated example, and the resource elements thereby created are physical channel mapped to the 19 valid PRBs.

Figure 6:
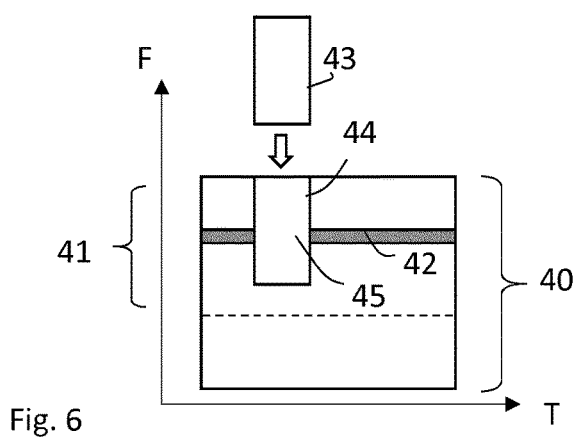
FIG. 6 illustrates another embodiment of scheduling communication for avoiding collision.

FIG. 6 illustrates the potential outcome of allocation in another embodiment, which may employ DCI (Downlink Control Indicator) signaling in LTE. In this embodiment, the device 100 is aware of potential locations of pre-allocated resources, such as NB-IoT carriers. Again, this knowledge may e.g. be gained by SIB signaling, device specific signaling, the device 100 decoding the system information of the second radio system, or through specification. When the device 100 is given an feMTC allocation via DCI, the DCI may indicate which NB-IoT carriers are active during that feMTC transmission. The feMTC UE can then proceed to puncture, rate match or apply postponing rules, as per the previous embodiments, dependent on a predetermined rule taking into account if the colliding resource will be used by the second radio system (NB-IoT). So, if the invalid resource is deemed to be occupied, a process according to e.g. any of the rules outlined with reference to FIGS. 4 and 5 may be employed, for avoiding that resource unit in the allocated resource 44. On the other hand, if the invalid resource unit is deemed not to be used in by the pre-allocated radio system, it may be allocated to the present transmission 44. This embodiment thus relates to a method for allocating resources within a grid of time and frequency for communication in a radio communications system under a first protocol, comprising the steps of determining an indication of a frequency resource range to be allocated for data communication between a base station and a device within the first radio protocol;

determining that a predetermined frequency resource within said range is pre-allocated to communication under a second radio protocol;

determining if the predetermined frequency resource is used or unused under a second radio protocol for a certain time period;

allocating a frequency resource for the communication in the first radio protocol which overlaps and either excludes or includes the predetermined frequency resource dependent on the determination of whether it is used or unused.

Where the predetermined resource is excluded, this may e.g. be carried out by postponing, as described with reference to FIG. 4, or by skipping as described with reference to FIG. 5. This embodiment thus operates dependent on the actual situation, and may in a situation as shown in FIG. 6 be more economic in terms of overall resource use, though more signaling is required. In an embodiment in LTE, it may be noted that NB-IoT anchor and secondary carriers are not always active and this embodiment allows the feMTC system to dynamically use resources that could potentially be used for NB-IoT. This embodiment recognizes that the NB-IoT anchor carrier may contain subframes in which it is not used (e.g. if there is not much traffic) and so rather than waste an RB resource, the eNB may indicate that this RB that is considered invalid in previous embodiments is used in this embodiment. A bit map of invalid RBs can be used in this signaling. For example, if within an feMTC narrowband, the RRC signaling indicates 2 potentially invalid RBs (e.g. 2 potential NB-IoT in-band carrier locations), the eNB can use 2 bits forming a bitmap that indicates whether any of these 2 invalid RBs can be used in the current allocation. As shown in FIG. 6, if the indicated range 43 of an feMTC transmission is allocated 44 over an otherwise invalid resource, that resource may nevertheless be allocated and used in the feMTC transmission, if it is deemed that system to which the resource was pre-allocated (e.g. NB-IoT) is not using that particular resource.

Various embodiments have been described by way of examples, setting out numerous ways of realizing ways of putting the invention into practice, which invention is limited only by the appended claims.

The invention claimed is:

1. A method for allocating resources within a grid of time and frequency for communication in a radio communications system under a first protocol, comprising determining an indication of a frequency resource range to be allocated for a first communication between a base station and a device within the first radio protocol;

determining that a predetermined frequency resource within said range is pre-allocated to a second communication under a second radio protocol, wherein the first radio protocol and the second radio protocol co-exist;

allocating, in response to determining that the predetermined frequency resource within said range is pre-allocated to the second communication under the second radio protocol, a frequency resource for the first communication in the first radio protocol which overlaps and excludes said predetermined frequency resource for the second communication, such that the allocated frequency resource for the first communication comprises a range of frequency resource units encompassing said predetermined frequency pre-allocated for the second communication, and has a frequency discontinuity corresponding to the predetermined frequency.

2. The method of claim 1, wherein said indication of a frequency resource range comprises identification of a number of frequency resource units and an indication of a position of the range within the grid.

3. The method of claim 2, wherein the indication of a position of the range comprises identification of a frequency resource unit having a predetermined position in said frequency resource range.

4. The method of claim 1, wherein the allocated frequency includes a frequency resource corresponding to the excluded predetermined frequency resource, taken at a different frequency resource position.

5. The method of claim 1, wherein the allocated frequency resource is reduced so as to include fewer resource units than said range, by skipping the excluded resource.

6. The method of claim 5, comprising the step of not transmitting data under the first protocol in the excluded resource, for puncturing by a receiver in the device.

7. The method of claim 5, comprising the step of rate matching the transmission to the reduced allocated resource.

8. The method of claim 1, comprising the step of broadcasting an indication of the pre-allocated frequency resource from the base station, for reception in the device.

9. The method of claim 1, comprising the step of determining if the predetermined frequency resource is used or unused under a second radio protocol for a certain time period;
including the predetermined frequency resource, for at least said time period, in the allocated frequency resource.

10. The method of claim 1, comprising the step of communicating, by dedicated signaling, an indication of the frequency resource range from the base station to the device.

11. The method of claim 1, wherein the base station comprises a scheduler device and the device is a user device.

12. The method of claim 1, wherein the first radio protocol and the second radio protocol are scheduled by a common radio system using the same resource grid.

13. A scheduler device in a radio communications system, comprising:
a processor; and
a computer readable storage medium storing programming for execution by the processor, the programming including instructions to carry out the steps of:
determining an indication of a frequency resource range to be allocated for a first communication between a base station and a device within a first radio protocol;
determining that a predetermined frequency resource within said range is pre-allocated to a second communication under a second radio protocol, wherein the first radio protocol and the second radio protocol co-exist;
allocating, in response to determining that the predetermined frequency resource within said range is pre-allocated to the second communication under the second radio protocol, a frequency resource for the first communication in the first radio protocol which overlaps and excludes said predetermined frequency resource for the second communication, such that the allocated frequency resource for the first communication comprises a range of frequency resource units encompassing said predetermined frequency pre-allocated for the second communication, and has a frequency discontinuity corresponding to the predetermined frequency.

14. The scheduler device of claim 13, wherein said indication of a frequency resource range comprises identification of a number of frequency resource units and an indication of a position of the range within the grid.

15. The scheduler device of claim 14, wherein the indication of a position of the range comprises identification of a frequency resource unit having a predetermined position in said frequency resource range.

16. The scheduler device of claim 13, wherein the allocated frequency includes a frequency resource corresponding to the excluded predetermined frequency resource, taken at a different frequency resource position.

17. A method carried out in a device for controlling communication to a base station in a first radio protocol, using resources allocated within a grid of time and frequency, comprising
receiving an indication of a frequency resource range allocated for a first communication under the first radio protocol;
receiving an indication of a predetermined frequency resource within said range, which is pre-allocated to a second radio protocol, wherein the first radio protocol and the second radio protocol co-exist;
determining, in response to receiving the indication of the predetermined frequency resource within said range which is pre-allocated to the second radio protocol, the allocated resources for the first communication in the first radio protocol, which overlaps and excludes said predetermined frequency resource for communication under the second radio protocol such that the allocated resources comprise a range of frequency resource units encompassing said predetermined frequency pre-allocated for the second radio protocol, and has a frequency discontinuity corresponding to the predetermined frequency, according to a predetermined rule.

18. The method of claim 17, wherein said predetermined rule includes one of puncturing, rate matching or applying postponing rules.

* * * * *